United States Patent [19]
Alms et al.

[11] Patent Number: 5,250,654
[45] Date of Patent: Oct. 5, 1993

[54] THERMOTROPIC LIQUID CRYSTALLINE POLYESTER COMPOSITIONS

[75] Inventors: Gregory R. Alms, Hockessin; Michael R. Samuels, Wilmington; Marion G. Waggoner, Hockessin, all of Del.

[73] Assignee: E. I. Du Pont de Nemours and Company, Wilmington, Del.

[21] Appl. No.: 878,150

[22] Filed: May 4, 1992

[51] Int. Cl.$^5$ .................. C08G 63/00; C08G 63/02
[52] U.S. Cl. .................... 528/193; 528/176; 528/190; 528/194
[58] Field of Search ............ 528/176, 190, 193, 194

[56] References Cited

U.S. PATENT DOCUMENTS

| | | | |
|---|---|---|---|
| 3,637,595 | 1/1972 | Cottis et al. | 260/17 C |
| 3,703,495 | 11/1972 | Jackson, Jr. | 260/30.6 R |
| 4,067,852 | 1/1978 | Calundann | 260/47 |
| 4,118,372 | 10/1978 | Schaefgen | 528/190 |
| 4,169,933 | 10/1979 | Jackson, Jr. et al. | 528/190 |
| 4,247,514 | 1/1981 | Luise | 264/345 |
| 4,485,230 | 11/1984 | Yu | 528/125 |
| 4,611,025 | 9/1986 | Akkapeddi et al. | 524/449 |
| 4,626,557 | 12/1986 | Duska et al. | 523/100 |
| 4,639,504 | 1/1987 | Cottis | 528/176 |
| 4,713,435 | 12/1987 | Sugimoto et al. | 528/179 |
| 4,742,149 | 5/1988 | Finestone | 528/179 |
| 4,849,499 | 7/1989 | Fagerburg et al. | 528/298 |
| 4,851,467 | 7/1989 | Frayer | 524/495 |
| 4,851,497 | 7/1989 | Wakui et al. | 528/176 |
| 4,900,804 | 2/1990 | Wakui et al. | 528/332 |
| 5,055,546 | 10/1991 | Sugimoto et al. | 528/193 |
| 5,071,942 | 12/1991 | Brewbaker et al. | 528/193 |
| 5,110,896 | 5/1992 | Waggoner et al. | 528/190 |
| 5,115,080 | 5/1992 | Waggoner et al. | 528/190 |

FOREIGN PATENT DOCUMENTS

| | | |
|---|---|---|
| 0356226 | 2/1990 | European Pat. Off. . |
| 62-81448 | 4/1987 | Japan . |
| 1-215823 | 8/1989 | Japan . |

OTHER PUBLICATIONS

Liquid Crystal Polymers. XI. Liquid Crystal Aromatic Polyesters: Early History And Future Trends by W. J. Jackson, Jr. (1989) pp. 23–49 Excerpted from Mol. Cryst. Liq. Cryst., 1989, vol. 169.

*Primary Examiner*—John Kight, III
*Assistant Examiner*—T. Mosley

[57] ABSTRACT

This invention relates to thermotropic liquid crystalline polyester compositions containing recurring units derived from hydroquinone, 4,4'-dihydroxybiphenyl, terephthalic acid, 2,6-naphthalenedicarboxylic acid, 4,4'-bibenzoic acid, and 4-hydroxybenzoic acid which are characterized as having melting points less than 365° C., breaking elongations greater than or equal to 1.5%, and heat distortion temperatures greater than 200° C.

This invention further relates to the same compositions containing 20 to 40 weight percent of at least one glass reinforcing/filling agent and which are characterized as having melting points less than 365° C., breaking elongations greater than or equal to 1.8%, and heat distortion temperatures greater than 230° C.

The compositions are useful as films, fibers, and shaped or molded articles.

11 Claims, No Drawings

THERMOTROPIC LIQUID CRYSTALLINE POLYESTER COMPOSITIONS

1. Technical Field

This invention relates to novel thermotropic liquid crystalline polyester compositions prepared from hydroquinone, 4,4'-dihydroxybiphenyl, terephthalic acid, 2,6-naphthalenedicarboxylic acid, 4,4'-bibenzoic acid, and 4-hydroxybenzoic acid. The compositions are characterized as having melting points less than 365° C., breaking elongations greater than or equal to 1.5%, and heat distortion temperatures greater than 200° C.

This invention further relates to novel glass reinforced/filled thermotropic liquid crystalline polyester compositions prepared from the same components given above and additionally containing 20 to 40 weight percent of at least one glass reinforcing/filling agent. These glass reinforced/filled compositions are characterized as having melting points less than 365° C., breaking elongations greater than or equal to 1.8%, and heat distortion temperatures greater than 230° C.

The thermotropic liquid crystalline polyester compositions of the present invention and the glass reinforced/filled thermotropic liquid crystalline polyesters of the present invention are advantageous because they have melting points less than 365° C., which allows them to be manufactured and processed without undergoing significant thermal degradation.

The thermotropic liquid crystalline polyester compositions of the present invention are further advantageous because they have breaking elongations greater than or equal to 1.5%; the glass reinforced/filled thermotropic liquid crystalline polyester compositions of the present invention are further advantageous because they have breaking elongations greater than or equal to 1.8%. Breaking elongation is a measure of the toughness of a composition and increasing values are highly desirable. Breaking elongations in molded parts greater than or equal to 1.5% (or greater than or equal to 1.8% for 20 to 40 weight percent glass reinforced/filled compositions) are rare in liquid crystalline polyester compositions and are very desirable for many high temperature end-use applications.

The liquid crystalline polyester compositions of the present invention are also advantageous because they have heat distortion temperatures greater than 200° C.; the glass reinforced/filled liquid crystalline polyester compositions of the present invention are also advantageous because they have heat distortion temperatures greater than 230° C. Such heat distortion temperatures make both types of compositions useful for many high temperature end-use applications. Examples of high temperature end-use applications include, but are not limited to, electrical end-use applications, such as those involving assembly with high temperature soldering techniques (such as vapor phase reflow and infrared soldering) and automotive end-use applications.

The thermotropic liquid crystalline polyester compositions of the present invention can be formed into fibers, films, monofilaments, molded articles, and shaped articles. The glass reinforced/filled thermotropic liquid crystalline polyester compositions of the present invention can be formed into molded articles or shaped articles. Both types of compositions are useful in applications where it is desired to use a polymer composition having a high breaking elongation, a melting point less than 365° C., and a high heat distortion temperature.

SUMMARY OF THE INVENTION

This invention relates to thermotropic liquid crystalline polyester compositions consisting essentially of recurring units of

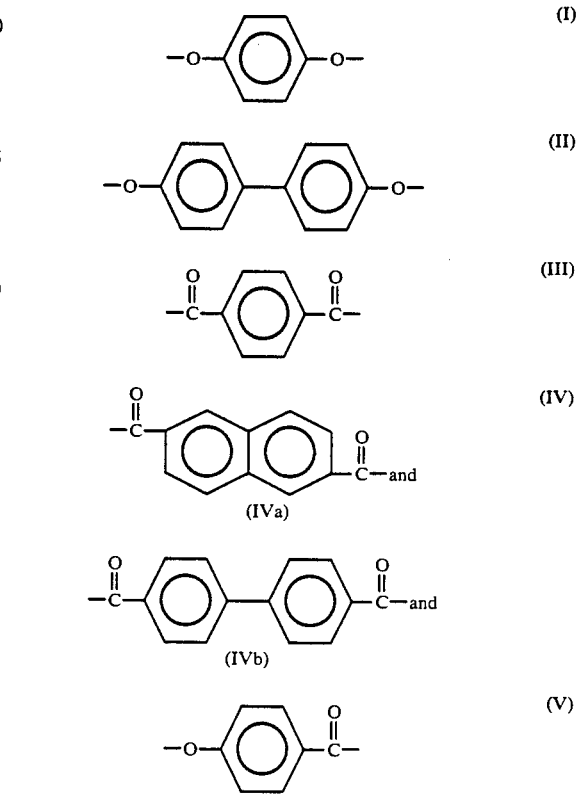

wherein the molar ratio of (I):(II) ranges from 65:35 to 40:60, wherein the molar ratio of (III):(IVa+IVb) ranges from 85:15 to 50:50, wherein the molar ratio of the sum of (I) and (II) to the sum of (III) and (IVa+IVb) is substantially 1:1, wherein there are 100 to 400 moles of (V) per 100 moles of (I) plus (II), and wherein the molar ratio of (IVb) to (IVa) is 0.001:1 to 2:1. The compositions of the present invention have breaking elongations greater than or equal to 1.5%, which are indicative of a high degree of toughness, melting points less than 365° C., which minimize thermal degradation during manufacturing and processing, and heat distortion temperatures greater than 200° C., which are required in many high temperature end-use applications.

In addition, the present invention relates to glass reinforced/filled thermotropic liquid crystalline polyester compositions consisting essentially of (a) 80 to 60 weight percent of the thermotropic liquid crystalline polyester composition described in the immediately preceding paragraph and (b) 20 to 40 weight percent of at least one glass reinforcing/filling agent, with said weight percent being based upon the weight of component (a) and (b) only. These glass reinforced/filled compositions have melting points less than 365° C., breaking elongations greater than or equal to 1.8%, and heat distortion temperatures greater than 230° C.

The thermotropic liquid crystalline polyester compositions of the present invention and the glass reinforced/filled thermotropic liquid crystalline polyester compositions of the present invention can be formed into shaped and/or molded articles and are useful when it is desired to use a polymer composition having a breaking elongation greater than or equal to 1.5% (and greater than or equal to 1.8% for the glass reinforced/filled compositions), a melting point less than 365° C., and a heat distortion temperature greater than 200° C. (and greater than 230° C. for the glass reinforced/filled compositions).

DETAILED DESCRIPTION OF THE INVENTION

The present invention relates to certain thermotropic liquid crystalline polyester compositions characterized as having breaking elongations greater than or equal to 1.5%, heat distortion temperatures greater than 200° C., and melting points less than 365° C.

The present invention also relates to certain glass reinforced/filled thermotropic liquid crystalline polyester compositions containing 20 to 40 weight percent of at least one glass reinforcing/filling agent, said compositions characterized as having breaking elongations greater than or equal to 1.8%, heat distortion temperatures greater than 230° C., and melting points less than 365° C.

Thermotropic liquid crystalline polyester compositions are known in the art and are described by various terms, including "liquid crystal" and "anisotropic melts". Briefly, thermotropic liquid crystalline polyester compositions involve a parallel ordering of molecular chains in the melt. The molten state wherein molecules are of such a parallel order is often referred to as the liquid crystal state. Liquid crystalline polyesters are prepared from monomers which are generally long, flat, and fairly rigid along the axis of the molecule and have chain extending linkages that are either coaxial or parallel. Whether or not a polymer is in a liquid crystal state can be determined by known procedures for determining optical anisotropy. Such procedures are described in U.S. Pat. No. 4,118,372, column 5, lines 40–68 and columns 8–9, incorporated herein by reference.

Liquid crystalline polyester compositions are known to have exceptionally high tensile strength and modulus compared to analogous polymers not having a liquid crystalline character. However, it continues to be desirous to develop liquid crystalline polyester compositions with improved properties, such as increased breaking elongation, which is a measure of toughness. It is further desirous to develop liquid crystalline polyester compositions with relatively low melting points (such as less than 365° C.) because the ease of processability of the composition increases as the melting point decreases and the potential for thermal degradation during manufacturing and processing decreases as manufacturing and processing temperatures decrease, particularly if they decrease to below 365° C.

In the present invention, thermotropic liquid crystalline polyester compositions prepared from hydroquinone, 4,4'-dihydroxybiphenyl, terephthalic acid, 2,6-naphthalenedicarboxylic acid, 4,4'-bibenzoic acid, and 4-hydroxybenzoic acid, have been developed that have breaking elongations greater than or equal to 1.5%, melting points less than 365° C., and heat distortion temperatures greater than 200° C.

The compositions described in the immediately preceding paragraph may also contain 20 to 40 weight percent of at least one glass reinforcing/filling agent. Such glass reinforced/filled compositions have breaking elongations greater than or equal to 1.8%, melting points less than 365° C., and heat distortion temperatures greater than 230° C.

I. The Thermotropic Liquid Crystal Polyester Compositions and Glass Reinforced/Filled Versions Thereof Specifically, the thermotropic liquid crystalline polyester compositions of the present invention consist essentially of recurring units derived from (a) hydroquinone, having structure (I),

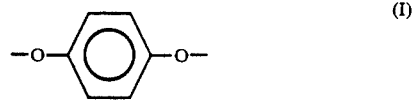

(b) 4,4'-dihydroxybiphenyl, having structure (II),

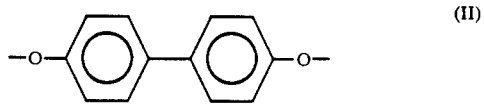

(c) terephthalic acid, having structure (III),

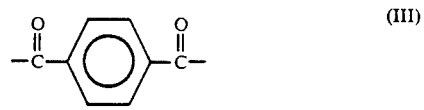

(d) 2,6-naphthalenedicarboxylic acid, having structure (IVa), and 4,4'-bibenzoic acid having structure (IVb),

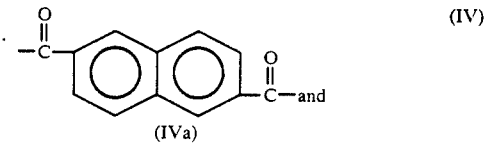

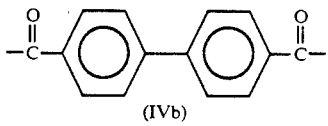

and (e) 4-hydroxybenzoic acid, having structure (V),

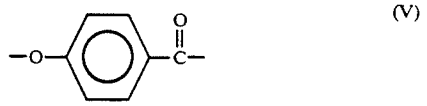

wherein the molar ratio of (I):(II) is from 65:35 to 40:60, preferably from 65:35 to 40:60, and most preferably from 60:40 to 40:60, wherein the molar ratio of (III):(IVa+IVb) is from 85:15 to 50:50, preferably from 85:15 to 50:50, and most preferably from 85:15 to 60:40, wherein the molar ratio of the total of (I) and (II) to the total of (III) and (IVa+IVb) is substantially 1:1, preferably 0.95–1.05:1.00, wherein there are 100 to 400, and preferably 200 to 350 moles of (V) per 100 moles of (I) plus (II), and further wherein the molar ratio of (IVb) to (IVa) is 0.001:1 to 2:1, preferably 0.01:1 to 1:1. Use of less than 200 moles of (V) may yield a liquid crystalline polyester composition having the properties described herein; however, such an amount could be undesirable for economic reasons. The compositions of the present invention are characterized as having breaking elongations greater than or equal to 1.5%, melting points less than 365° C., and heat distortion temperatures greater than 200° C.

The present invention further relates to the thermotropic liquid crystalline polyester compositions described in the immediately preceding paragraph which additionally contain 20 to 40 weight percent, preferably 20 to 35 weight percent, and most preferably 25 to 35 weight percent, of at least one glass reinforcing/filling agent, with said weight percent ranges being based upon the weight of the liquid crystalline polyester and the glass reinforcing/filling agent only. These glass reinforced/filled thermotropic liquid crystalline polyester compositions have breaking elongations greater than or equal to 1.8%, melting points less than 365° C., and heat distortion temperatures greater than 230° C.

The components of the thermotropic liquid crystalline polyester compositions of the present invention and the components of the glass reinforced/filled thermotropic liquid crystalline polyester compositions of the present invention (i.e., hydroquinone, 4,4'-dihydroxybiphenyl, terephthalic acid, 2,6-naphthalenedicarboxylic acid, 4,4'-bibenzoic acid, 4-hydroxybenzoic acid, and glass reinforcing/filling agents) are all known in the art and are commercially available or can be prepared by techniques readily available to those skilled in the art.

Both the thermotropic liquid crystalline polyester compositions of the present invention and the glass reinforced/filled thermotropic liquid crystalline polyester compositions of the present invention have a flow temperature below 370° C., preferably below 360° C., and a melt viscosity greater than 20 Pascal seconds, preferably greater than 25 Pascal seconds, measured at 365° C. and 1000 sec$^{-}$ shear rate (as measured in a constant shear rate melt rheometer using ASTM-D 3835).

In addition to the components described above, the thermotropic liquid crystalline polyester compositions of the present invention and the glass reinforced/filled liquid crystalline polyester compositions of the present invention can contain other additives, ingredients, and modifiers known to be added to liquid crystalline polyester compositions, such as, but not limited to, fillers (such as calcium metasilicate, calcium carbonate, talc, titanium dioxide, calcined aluminum silicate), catalysts, nucleating agents, colorants, carbon fiber, antioxidants, stabilizers, plasticizers, lubricants, carbon black, fire retardants, and synergists.

II. Preparation of the Liquid Crystalline Polyester Compositions and Glass Reinforced/Filled Versions Thereof The liquid crystalline polyester compositions of the present invention may be prepared from the appropriate monomers, or precursors thereof, by standard polycondensation techniques (which can include either melt, solution, and/or solid phase polymerization), preferably under anhydrous conditions and in an inert atmosphere. For example, the requisite amounts of acetic anhydride, the diols, the hydroxybenzoic acid (or optionally the acetate/diacetate derivatives of the diols/hydroxybenzoic acid), and the diacids, and optionally up to 20 percent excess acetic anhydride, are combined in a reactive vessel equipped with a stirrer, nitrogen inlet tube, and combination distillation head/condenser (to facilitate by-product removal). The reaction vessel and other equipment are dried and purged with nitrogen prior to use. The vessel and stirred contents, maintained under nitrogen, are heated during which time the ingredients react and any by-product formed (such as, for example, acetic acid) is removed via the distillation head/condenser and is collected. When the polymerization appears nearly complete, as indicated by the amount of by-product collected remaining constant, the molten mass is placed under reduced pressure (e.g. 10 mm of Hg(abs) or less) and is heated to a higher temperature, to facilitate removal of any remaining by-product and to complete the polymerization.

The melt may then be removed, cooled, and allowed to solidify prior to purification and/or subsequent processing, such as melt compounding the liquid crystalline polyester composition with a glass reinforcing/filling agent, such as in the present invention, and/or other additives. Melt compounding can be accomplished by any device capable of mixing the molten liquid crystalline polyester with other additives, such as glass. A preferred device is an extruder, either single or twin screw. Twin screw extruders may be either co-rotating or counter-rotating.

Optionally, the molten polymer may be transferred directly to an appropriate apparatus, such as a melt extruder and/or injection molding machine or spinning unit, for the preparation of articles, such as molded and/or shaped articles, fibers, films, monofilaments, and bars. Articles prepared from the compositions of the present invention may further be heat treated in accordance with U.S. Pat. No. 4,247,514 (Luise), incorporated herein by reference. By the process described in U.S. Pat. No. 4,247,514, articles prepared from liquid crystalline polymers are treated from above 140° C. to below the flow temperature of the polymer from which it was prepared for a period of time sufficient to increase energy to break in flexure by at least 25% in at least one direction of measurement. Further details on this process can be found in U.S. Pat. No. 4,247,514.

Polymerization conditions may be varied according to, e.g., the reactants employed and the degree of polymerization desired.

EXAMPLES

In the following Examples, there are shown specific embodiments of the present invention, along with embodiments outside the literal scope of the present invention that are included for comparative purposes.

In the Examples below, the following components were used:
(1) "HQ" was hydroquinone,
(2) "BP" was 4,4'-dihydroxybiphenyl,
(3) "T" was terephthalic acid,
(4) "2,6N" was 2,6-naphthalenedicarboxylic acid,
(5) "4HBA" was 4-hydroxybenzoic acid,
(6) "Glass" was a commerically available fiber glass having an average fiber length of ⅛ inch, as determined by standard rule, calibrated to 1/16 inch, and
(7) "BB" was 4,4'-bibenzoic acid.

Preparation of LCP 1

LCP 1 was prepared as follows: the reactants were charged into a reaction vessel equipped with a Vigreux column, condenser, and a stirrer (stir speed set at about 50 rpm). The reactants initially charged into the reaction vessel are detailed in Table I below. The resultant reaction mixture was heated to reflux and then was refluxed for about 60 minutes, during which time the pot temperature was held constant at about 170° C. During the next approximately 240 minutes, the pot temperature was slowly raised to about 370° C. and by-product acetic acid was removed. At a pot temperature of about 350° C., vacuum was applied to reduce the pressure to about 630 mm of Hg (absolute). The pressure was then further reduced over the next approximately 85 minutes to about 5-10 mm of Hg (absolute) while by-product acetic acid was removed. At the same time, the stirrer speed was reduced to about 30 rpm and the pot temperature was maintained at about 370° C. The polymerization reaction was terminated approximately 6 hours after the reactants were charged into the reaction vessel, when the polymer melt viscosity was greater than about 25 Pa.S, measured at 365° C. and 1000 reciprocal seconds shear rate.

Preparation of LCP 2-7 and LCP Control 1-3

In the examples below, LCP 2-7 and LCP Control 1-3 were each prepared by substantially the same method. For each of these LCP compositions, the reactants were charged into a reaction vessel equipped with a Vigreux column, condenser, and a stirrer (stir speed set at 125 rpm). The reactants initially charged into the reaction vessel for each example are detailed in Table I below. The resultant reaction mixture was heated to reflux. Reflux began at a pot temperature between 155° C. and 160° C. The reaction mixture was refluxed for about 40 minutes, at constant pot temperature of 170° C. After the total reflux period was completed, the pot temperature set point was immediately increased to 200° C., and removal of by-product acetic acid was begun. Thereafter, the temperature was increased by 20° C. increments at 10 minute intervals, until the temperature had reached 370° C., while continuing to remove acetic acid. Then, vacuum was applied to reduce the pressure to about 660 mm of Hg (absolute). Thereafter, the pressure was reduced in 100 mm steps every 15-20 minutes until a pressure of about 1.0 mm of Hg (absolute) was reached. As the viscosity increased, the stirrer speed was gradually reduced to about 20 rpm.

The polymerization reaction was terminated when the melt viscosity was greater than or equal to 25 Pa.S at 365° C. and 1000 reciprocal seconds shear rate. The total reaction time after the components were initially charged into the reaction vessel was approximately 4-5 hours.

TABLE I

| | Amount of Reactants Charged Into Reaction Vessel | | | | | | |
|---|---|---|---|---|---|---|---|
| Example | BP (g) | HQ (g) | T (g) | 2,6-N (g) | BB (g) | 4HBA (g) | Acetic Anhydride (g) |
| LCP 1 | 116.3 | 68.8 | 145.3 | 54.0 | 30.2 | 552.3 | 683.3 |
| LCP 2 | 116.3 | 68.8 | 145.3 | 54.0 | 30.2 | 552.3 | 682.7 |
| LCP 3 | 115.7 | 68.4 | 144.3 | 16.1 | 72.2 | 549.3 | 679.1 |
| LCP 4 | 115.1 | 68.0 | 123.2 | 53.4 | 59.8 | 546.2 | 675.2 |
| LCP 5 | 189.7 | 112.1 | 236.9 | 66.1 | 73.9 | 281.3 | 642.1 |
| LCP 6 | 117.8 | 69.6 | 178.6 | 20.5 | 23.0 | 559.0 | 639.8 |
| LCP 7 | 116.7 | 69.0 | 145.8 | 77.2 | 4.6 | 554.0 | 684.9 |
| Control 1 | 0 | 142.7 | 107.6 | 70.0 | 78.4 | 572.6 | 707.9 |
| Control 2 | 216.2 | 0 | 96.4 | 62.8 | 70.2 | 513.1 | 634.3 |
| Control 3 | 94.5 | 55.9 | 118.0 | 32.9 | 36.8 | 630.7 | 693.0 |

COMPOUNDING OF THE LCP AND MOLDING TEST BARS

Unless otherwise specified, compounding of the LCP compositions in the Examples below with any other component, including glass, was done in a 28 mm Werner and Pfleiderer twin-screw extruder having a zone with conventional conveying elements, a zone with kneading or mixing elements, and a low pressure zone with venting under vacuum of any volatiles from the polymer melt, and a die. As the compounded LCP compositions exited the die, they were quenched with a water spray and cut into pellets with a conventional strand cutter. The extruder barrel and die temperatures were maintained at about 290° C.-320° C. and 300°-320° C., respectively. Prior to molding the pellets, the pellets were dried overnight for approximately 16 hours in a vacuum oven with $N_2$ purge at 100°-130° C. The dried polymer pellets were molded into standard test bars, as required per ASTM D638 for determining tensile properties, on either a 1½ oz Arburg molding machine or a 6 oz HPM molding machine with barrel temperatures of 330°-360° C. and injection pressures of 4000-6000 psi.

TESTS

The LCP compositions of the Examples below were tested to determine melting point ($T_m$), breaking elongation, tensile strength, and heat distortion temperature (HDT).

$T_m$ was determined using a 25° C./minute heating rate with a Du Pont Model 1090 Dual Sample Differential Scanning Calorimeter by ASTM D3418-82 (measured on the first heat). Tensile strength and elongation at break were determined in accordance with ASTM D638. HDT was determined in accordance with ASTM D648.

TEST RESULTS

The test results for each LCP composition prepared as described above are detailed in Table II below.

LCP 1 through LCP 7 all had varying amounts of 4,4'-bibenzoic acid present in the polymer. Each of LCP 1 through LCP 7 melted below 365° C. The 30% glass reinforced version of LCP 1 through LCP 7 had elongations of greater than or equal to 1.8% and higher and heat distortion temperatures greater than 230° C.

TABLE II

| | | | | 30% Glass Reinforced Compositions | |
|---|---|---|---|---|---|
| Example | Monomer Molar Ratio (BP/HQ-T/2,6N/BB-4HBA) | Tm (°C.) | HDT (°C.) | Breaking Elongation (%) | Tensile Strength (kpsi) |
| LCP-1 | 50/50-70/20/10-320 | 347 | 276 | — | — |

TABLE II-continued

| Example | Monomer Molar Ratio (BP/HQ-T/2,6N/BB-4HBA) | Tm (°C.) | 30% Glass Reinforced Compositions | | |
|---|---|---|---|---|---|
| | | | HDT (°C.) | Breaking Elongation (%) | Tensile Strength (kpsi) |
| LCP-2 | 50/50-70/20/10-320 | 338 | 272 | 2.1 | 18.4 |
| LCP-3 | 50/50-70/6/24-320 | 342 | 281 | 2.3 | 18.5 |
| LCP-4 | 50/50-60/20/20-320 | 326 | 254 | 1.9 | 17.8 |
| LCP-5 | 50/50-70/15/15-100 | 326 | 265 | 2.0 | 15.1 |
| LCP-6 | 50/50-85/7.5/7.5-320 | 360 | 299 | 1.8 | 21.2 |
| LCP-7 | 50/50/-70/28.5/1.5-320 | 342 | 275 | 1.8 | 18.6 |
| Control 1 | 0/100-50/25/25-320 | 349,407 | 269 | 1.1 | 11.9 |
| Control 2 | 100/0-50/25/25-320 | 301 | 248 | 1.3 | 15.2 |
| Control 3 | 50/50-70/15/15-450 | 374 | 274 | 1.2 | 14.0 |

We claim:

1. A thermotropic liquid crystalline polyester composition consisting essentially of recurring units of
structure (I),

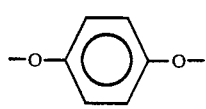

structure (II),

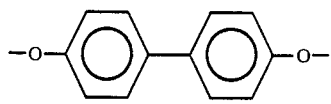

structure (III),

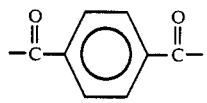

structure (IV),

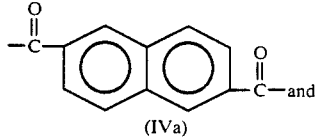

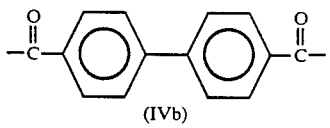

and
structure (V),

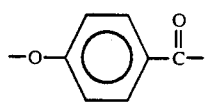

wherein the molar ratio of (I):(II) ranges from 65:35 to 40:60, wherein the molar ratio of (III):(IVa+IVb) ranges from 85:15 to 50:50, wherein the molar ratio of the total of (I) and (II) to the total of (III) and (IVa+IVb) is substantially 1:1, further wherein there are 100 to 400 moles of (V) per 100 moles of (I) plus (II), and further wherein the molar ratio of (IVb) to (IVa) is 0.001:1 to 2:1, having a melting point less than 365° C. and a heat distortion temperature greater than 200° C.

2. A glass reinforced/filled thermotropic liquid crystalline polyester composition consisting essentially of
    (a) 80 to 60 weight percent of a liquid crystalline polyester component consisting essentially of recurring units of
    structure (I),

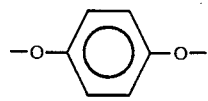

structure (II),

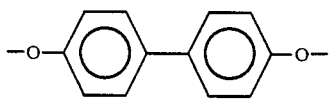

structure (III),

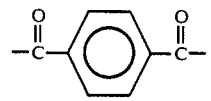

structure (IV),

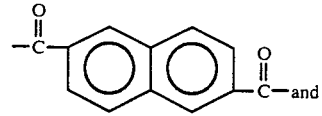

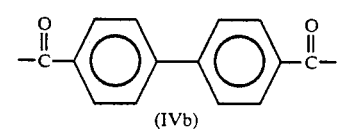

and
structure (V),

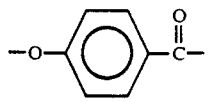 (V)

wherein the molar ratio of (I):(II) ranges from 65:35 to 40:60, wherein the molar ratio of (III):(IVa+IVb) ranges from 85:15 to 50:50, wherein the molar ratio of the total of (I) and (II) to the total of (III) and (IVa+IVb) is substantially 1:1, wherein there are 100 to 400 moles of (V) per 100 moles of (I) plus (II), and further wherein the molar ratio of (IVb) to (IVa) is 0.001:1 to 2:1 having a melting point less than 365° C. and a heat distortion temperature greater than 230° C.; and (b) 20 to 40 weight percent of at least one glass reinforcing/filling agent component, wherein the weight percents are based upon the weight of the component (a) and the component (b) only.

3. The composition of claims 1 or 2 wherein the molar ratio of (I):(II) ranges from 65:35 to 40:60, the molar ratio of (III):(IVa+IVb) ranges from 85:15 to 50:50, and wherein there are 200 to 350 moles of (V) per 100 moles of (I) plus (II).

4. The composition of claims 1 or 2 wherein the molar ratio of (I):(II) ranges from 60:40 to 40:60, the molar ratio of (III):(IVa+IVb) ranges from 85:15 to 60:40, wherein there are 200 to 350 moles of (V) per 100 moles of (I) plus (II), and further wherein the molar ratio of (IVb) to (IVa) is 0.01:1 to 1:1.

5. The composition of claims 1 or 2 further comprised of at least one of fillers, catalysts, nucleating agents, colorants, carbon fiber, antioxidants, stabilizers, plasticizers, lubricants, carbon black, fire retardants, and synergists.

6. The composition of claim 5 wherein the filler is selected from the group consisting of calcium metasilicate, calcium carbonate, talc, titanium dioxide, and calcined aluminum silicate.

7. Articles formed from the composition of claim 1.

8. An article of claim 7 selected from the group consisting of molded articles, shaped articles, films, monofilaments, and fibers.

9. An article of claim 7 that is heat treated at a temperature from above 140° C. to below the flow temperature of the polymer from which the shaped article is prepared for a period of time sufficient to increase energy to break in flexure by at least 25% in at least one direction of measurement.

10. Shaped or molded articles made from the composition of claim 2.

11. A shaped or molded article of claim 10 that is heat treated at a temperature from above 140° C. to below the flow temperature of the polymer from which the shaped article is prepared for a period of time sufficient to increase energy to break in flexure by at least 25% in at least one direction of measurement.

* * * * *